May 8, 1951
S. P. ROBINSON
2,552,063
LARGE SCALE PEBBLE HEATING CHAMBER
Filed Dec. 17, 1948
2 Sheets-Sheet 1
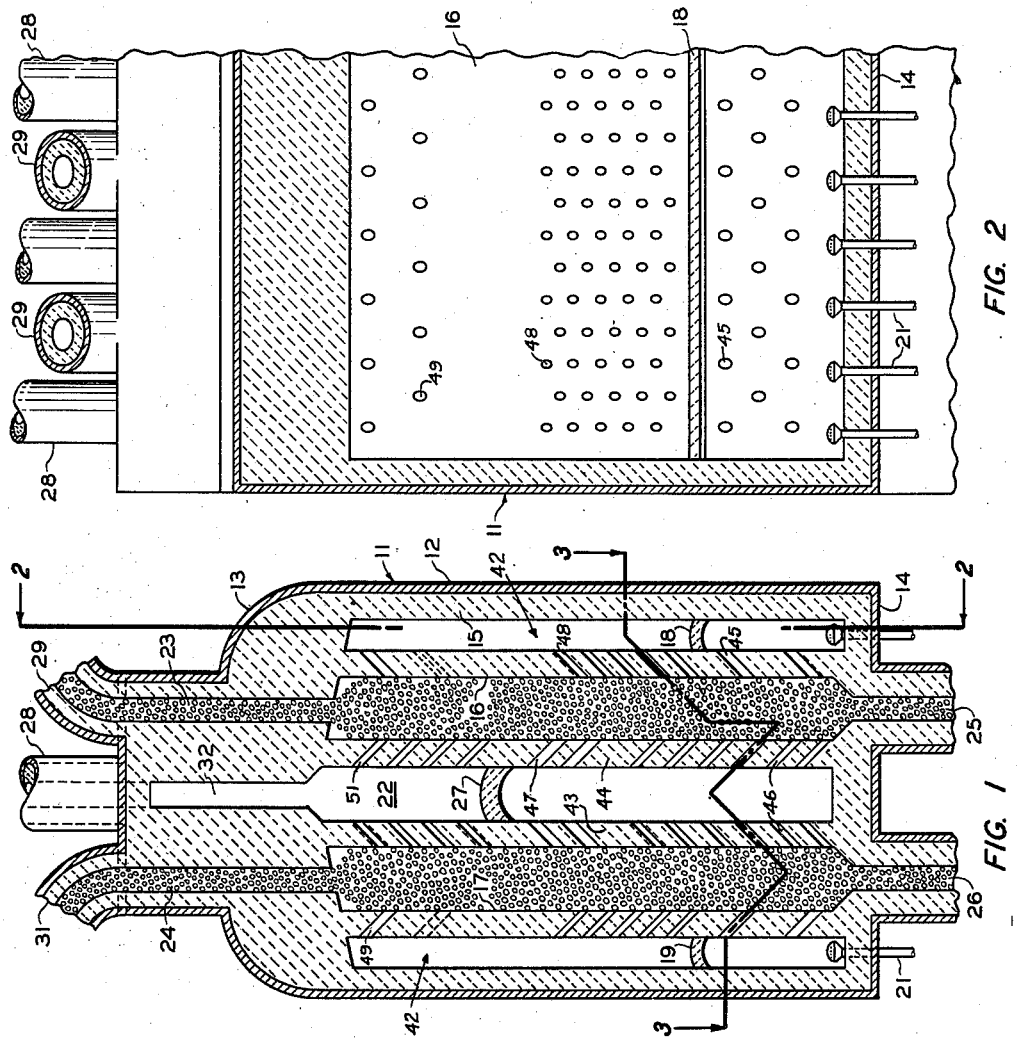
INVENTOR.
S. P. ROBINSON
BY Hudson and Young
ATTORNEYS May 8, 1951 S. P. ROBINSON 2,552,063
LARGE SCALE PEBBLE HEATING CHAMBER
Filed Dec. 17, 1948 2 Sheets-Sheet 2
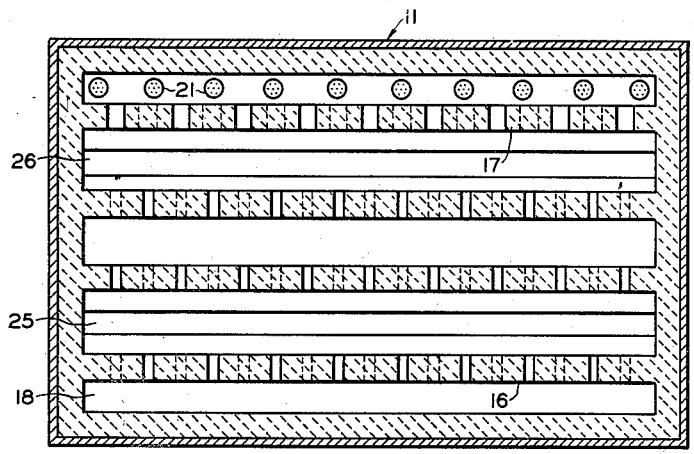
FIG. 3
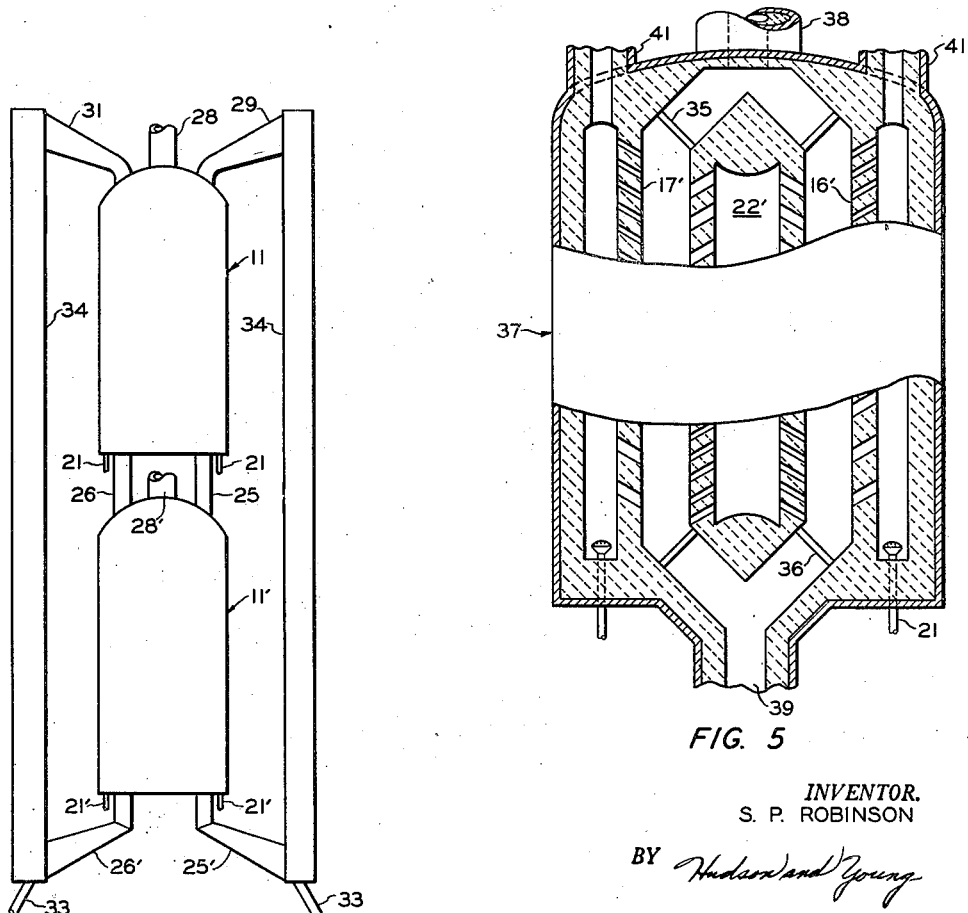
FIG. 4
FIG. 5
INVENTOR.
S. P. ROBINSON
BY Hudson and Young
ATTORNEYS Patented May 8, 1951

2,552,063

UNITED STATES PATENT OFFICE 2,552,063

LARGE SCALE PEBBLE HEATING CHAMBER

Sam P. Robinson, Bartlesville, Okla., assignor to Phillips Petroleum Company, a corporation of Delaware Application December 17, 1948, Serial No. 65,870

2 Claims. (Cl. 257—55)

This invention relates to pebble heat exchangers. In one of its more specific aspects it relates to pebble heat exchangers with heat exchange chambers having a high ratio of height to width. In another of its more specific aspects it relates to a method of obtaining improved heat exchange between large volumes of fluent solid heat exchange material and gaseous heat exchange material.

Processes which are carried out in so-called pebble heat exchange apparatus utilize a flowing mass of solid heat exchange material, which material is heated or cooled to a desired temperature by passing a first heat exchange fluid therethrough in a first direct heat exchange step and is then caused to contact a second heat exchange fluid in a second direct heat exchange step so as to heat or cool the second heat exchange fluid. Conventional pebble heat exchange apparatus generally comprises two chambers which may be disposed in substantially vertical alignment. The solid heat exchange material is introduced into the upper portion of the first chamber. That solid material forms a fluent bed which flows downwardly through the chamber in direct heat exchange with the first fluid heat exchange material. The solid heat exchange material is heated or cooled to a desired temperature in the heat exchange and is then passed to the lower chamber in which the solid heat exchange material is caused to contact the second fluid heat exchange material in a second direct heat exchange relation.

Conventional pebble heat exchange chambers of pebble heat exchangers are generally formed as cylinders in which solid heat exchange material is collected in the form of a moving or fluent bed. Gaseous heat exchange material is introduced into the lower end of the cylindrical heat exchange material bed formed within the heat exchange chamber and at its periphery. The solid heat exchange material is usually drawn from a substantially central point in the bottom of the solid heat exchange material bed and is passed downwardly into a second heat exchange chamber where a second moving bed of solid heat exchange material is formed. One disadvantage of conventional pebble heat exchange chambers is that it is most difficult to establish uniform flow of solid heat exchange material within the chambers so as to supply uniformly heated or cooled solid heat exchange material from one heat exchange chamber to the other. In the withdrawal of solid heat exchange material from a substantially central point in the bottom of such conventional heat exchange chambers, the moving portion of the solid heat exchange material tends to describe a cone in the lower portion of the chamber. That material which is below and outside of the cone formed by the moving solid heat exchange material remains in what is substantially a stagnant area within the heat exchange chamber. At the same time, when solid heat exchange material is introduced centrally into the upper portion of the heat exchange chamber, the top of the solid heat exchange material bed is formed as an inverted cone extending downwardly and outwardly from the solid material inlet in the top of the chamber. It will thus be seen that that portion of the solid heat exchange material which gravitates through the heat exchange chamber is bounded by a cylindrical periphery and is capped top and bottom by oppositely extending cones. Gaseous heat exchange material which is introduced at the bottom of the solid material bed seeks a path of least resistance upwardly through the solid heat exchange material bed. Inasmuch as the bed is thinner at its outer periphery than at points closer to its axis, the gas tends to channel through that portion of material making up the peripheral portion of the solid heat exchange material bed. The stagnant solid heat exchange material which comes to rest in the stagnant areas formed below the bottom cone of the moving solid heat exchange material bed, having once acted in heat exchange relation with the gaseous heat exchange material, acquires and remains at approximately the temperature of the incoming gas, thus failing to substantially enter into further heat exchange relation with the gaseous heat exchange material. It remains, then, that only the moving portion of the solid heat exchange material will continue to enter into heat exchange with the gas. It will thus be seen that the gaseous heat exchange materials flowing through the peripheral portion of the bed pass through a relatively thin layer of the solid material bed which will enter into a heat exchange relation therewith. For the reasons above described, relatively inefficient heat exchange is obtained in the operation of such an apparatus when compared to the operation of the apparatus of this invention.

Solid heat exchange material which is conventionally used in such heat exchange systems is generally called "pebbles." The term pebbles as used herein denotes any solid refractory material of flowable size and form which is capable of carrying relatively large amounts of heat from one heat exchange chamber to another and which has sufficient strength to withstand the mechanical pressure and thermal changes within the heat exchange chambers without rapid deterioration or substantial breakage. Pebbles which are conventionally used in pebble heat exchangers are substantially spherical in shape and range from about one-eighth inch to about one inch in diameter. In processes utilizing extremely high or extremely low temperatures, pebbles having a diameter of between about one-fourth inch and three-eighths inch are preferred. The pebbles are formed of a refractory material which will withstand temperatures at least as high or as low as the highest or lowest temperature, respectively, attained in the pebble heat exchange chambers. The pebbles most capable of withstanding temperature changes within pebble heater apparatus include such refractory materials as metal alloys, ceramics, or other such materials. Among specific materials which may be used for high temperature operation are silicon carbide, alumina, periclase, beryllia, Stellite, zirconia, and mullite, either singly or in admixture with each other or with other materials. Pebbles formed of such materials, when properly fired, serve very well in high temperatures, some withstanding temperatures up to about 4000° F. Pebbles which are used may be either inert or catalytic depending upon the selected process. Materials which may be used in low temperature processes include alumina, aluminum, nickel, cobalt, copper, iron, magnesia, and zirconia. These materials also may be used singly or in combination with each other or in combination with other materials to form desirable pebbles. Pebbles formed of such materials serve very well in pebble coolers which operate at temperatures as low as −300° F. At extremely low temperatures, preference is given to pebbles composed of nickel-steel and nickel-copper alloys.

An object of this invention is to provide an improved pebble heat exchanger. Another object of this invention is to provide an improved pebble heat exchanger which will maintain pebble beds therein having narrow horizontal cross-sections. Another object of this invention is to provide an improved pebble heat exchanger which will maintain pebble beds therein having long horizontal cross-sections. Another object of the invention is to provide a heat exchanger which will maintain pebble beds therein having a high ratio of height to width. Another object of the invention is to provide improved means for more evenly heating or cooling heat exchange pebbles in pebble heat exchange chambers. Another object of the invention is to provide a pebble heat exchanger which will heat or cool large volumes of pebbles therein with a relatively small pressure drop through the apparatus. Another object of the invention is to provide an improved apparatus and method for simultaneously heating and cooling large volumes of heat exchange pebbles. Other and further objects and advantages of this invention will be apparent from the accompanying disclosure.

Understanding of the invention will be facilitated upon reference to the diagrammatic drawings in which Figure 1 is a vertical end-section of a pebble heat exchange chamber of this invention. Figure 2 is a broken vertical side section taken along line 2—2 of Figure 1. Figure 3 is a top view in section taken along line 3—3 of Figure 1. Figure 4 is a schematic end view of the pebble heat exchange apparatus of this invention. Figure 5 is a vertical end elevation, partially in section, of a preferred modification of the heat exchange chamber of this invention.

In Figure 1 of the drawing, pebble heat exchange chamber 11 comprises an outer shell 12 which is closed at its upper and lower ends by closure members 13 and 14, respectively. Shell 12 may be interiorly insulated by insulation material 15. Perforate partitions 16 and 17 are closely spaced from the insulated side walls of shell 12 so as to form long, thin gas passages 42 therebetween. Partitions 16 and 17 extend from one end wall to the other end wall of chamber 11 and extend upwardly from the floor of chamber 11 to the top of such chamber so that the long, thin passages formed adjacent the side walls of shell 12 communicate with the space formed between partitions 16 and 17 only by means of the perforations in partitions 16 and 17. Baffle members 18 and 19 are provided in the lower portions of the chambers adjacent the side walls of shell 12 and extend from one end wall to the other end wall and between the side walls of those long, thin passages so as to completely separate the lower portion of such passages from the upper portion of those passages. Gaseous material injectors 21 are provided in the lower portion of the chambers formed adjacent the walls of shell 12 and below baffle members 18 and 19. As diagrammatically illustrated in Figure 1, injectors 21 extend vertically through the bottom end closure of shell 12 and extend into the gas passages below baffles 18 and 19. Injectors 21 may extend into the passages below baffles 18 and 19 at any desired angle or position. A perforate-walled inner chamber 22 formed by wall members 43 and 44 is disposed equi-distant partitions 16 and 17 and extends from one end wall of chamber 11 to the other end wall thereof. Chamber 22 also extends from the upper portion of the space formed between partitions 16 and 17 into the lower portion thereof. As shown in Figure 1 of the drawing, it is preferred that perforate walled chamber 22 extend from the top downwardly to the floor of chamber 11. Pebble inlet conduits 23 and 24 are provided in the upper portion of the chambers formed between chamber 22 and partitions 16 and 17, respectively. Pebble outlet conduits 25 and 26 are provided in the lower portion of the chambers formed between chamber 22 and partitions 16 and 17, respectively. Conduits 25 and 26 are preferably long, uninterrupted slots, but any pebble outlets having a minimum opening dimension of at least seven pebble diameters and disposed equi-distant the lateral side walls forming each space may be utilized. Baffle member 27 is disposed within chamber 22 so as to completely close the portion of chamber 22 thereabove from the portion therebelow. Baffle member 27 is provided above the horizontal level of baffle members 18 and 19. Effluent outlet conduits 28 are provided in the upper portion of chamber 11 and communicate between the portion of chamber 22 above baffle member 27 and the exterior of chamber 11.

The perforations in partitions 16, 17 and the walls of chamber 22 preferably slope inwardly and downwardly toward the spaces formed between chamber 22 and partitions 16 and 17, respectively. The walls of chamber 11 are parallel, preferably so as to form a rectangular chamber. Any configuration, however, in which the side walls are parallel and in which long, thin pebble chambers are provided, may be suitably utilized. Pebble inlet conduits 23 and 24 are preferably slots which extend from one end of chamber 11 to the other. Conduits 23 and 24 in such construction must be of such depth and pebble conduits 29 and 31 of such number that pebbles from pebble conduits 29 and 31 will form a long, thin contiguous pebble bed within inlet conduits 23 and 24 as the pebbles seek the static angle of repose after passing from conduits 29 and 31 into conduits 23 and 24. Pebbles from conduits 29 and 31 tend to form cones by rolling outwardly and downwardly from those conduits. Such funneling is restricted by the side walls of conduits 23 and 24 and for that reason the pebbles will flow longitudinally along conduits 23 and 24 so as to form inter-locking mounds of pebbles within conduits 23 and 24, respectively, which resemble cross-sections taken from inter-locking cones.

In the operation of the heat exchange chamber set forth in Figure 1 of the drawing, pebbles are passed through pebble conduits 29 and 31 into pebble inlet conduits 23 and 24. The pebbles from conduits 29 and 31 tend to seek the static angle of repose and flow outwardly and downwardly within conduits 23 and 24 to form a continuous contiguous fluid pebble bed within those conduits. The bed of pebbles gravitates downwardly to form fluent contiguous beds within the chambers formed between chamber 22 and partitions 16 and 17, respectively. Pebbles are removed from the pebble containing chambers through pebble outlet conduits 25 and 26. Gaseous heat exchange material is injected into the lower portion of the passages adjacent the side walls of shell 12 through injectors 21 and is passed upwardly therein until baffled by baffle members 18 and 19, and then is passed through perforations 45 in partitions 16 and 17 which are below baffle members 18 and 19, and laterally through the lower portion of the pebble beds. The gaseous heat exchange material passes through perforations 46 in the lower portion of the perforate walls of chamber 22 and passes upwardly through chamber 22 until baffled by baffle member 27 and passes outwardly through perforations 47 in the walls of chamber 22 which are relatively closely disposed below baffle member 27. The gases from chamber 22 flow laterally through the pebble bed and through perforations 48 in partitions 16 and 17 which are above baffle members 18 and 19. The gases pass upwardly through chambers 42 adjacent the side walls of shell 12 until they contact the top of those chambers and then flow through perforations 49 in partitions 16 and 17, flowing laterally through the upper portion of the pebble beds within the pebble containing chambers similarly to the flow heretofore described. In the final heat exchange between the gaseous material and the pebbles, the gaseous materials from the upper portion of the pebble bed pass through perforations 51 in perforate walls 43 and 44 of chamber 22 and pass upwardly through effluent outlet conduits 28. Effluent outlet conduits 28 may extend downwardly to the upper end of chamber 22 or may communicate with the upper portion of chamber 22 through a long narrow slot 32 which may extend from one end wall of chamber 11 to the other. In the preferred construction of the device shown in Figure 1, the gaseous material outlet perforations 45, 47, and 49 in partitions 16, 17 and in walls 43 and 44 of chamber 22 are preferably somewhat larger than the gaseous material inlet perforations 46, 48, and 51 in the same walls. The total cross-section of the gaseous material inlet groups of perforations laterally disposed from gaseous material outlet groups of perforations is, however, preferably greater than the total cross-section of the gaseous material outlet perforations. Such construction facilitates lateral flow of gases across the pebble bed within the pebble containing chambers. It is obvious that some small portions of the gaseous materials may pass upwardly through the pebble bed from the outlet perforations in the chamber walls. Such gaseous materials will, however, tend to seek a path of least resistance and will escape through gaseous material outlet perforations in the walls at some point thereabove. The length of pebble conduits 23 and 24 will necessarily have to be selected so as to provide a sufficient mass of pebbles therein to provide a choke which will substantially prevent the escape of gaseous materials upwardly through the pebble inlet conduits, thus causing the gases to seek a line of least resistance through the perforations in the walls of chamber 22.

Figure 2 diagrammatically shows the disposition of gas outlets and gas inlets in a portion of partition 16. The larger apertures 49 in the upper portion and 45 in the lower portion of partition 16 are the gas outlets and the smaller perforations 48 in the intermediate portion of the wall are the gas inlets. In the device set forth as Figure 3 in the drawings, the distribution of gas injectors 21 is shown above partition 17. Injectors 21 are not shown in the lower side of the chamber because of the fact that they are hidden from view by baffle member 18. Pebble outlet conduits 25 and 26 are shown as long, thin slots in the bottom portion of the pebble containing chambers.

The operation of the device set forth as Figure 4 of the drawing is similar to that described in connection with Figure 1 of the drawing. Pebbles are passed into chamber 11 through pebble inlet conduits 29 and 31 and gravitate downwardly therethrough as long thin fluent contiguous masses and are removed from the bottom of chamber 11 through pebble outlet conduits 25 and 26. Gaseous heat exchanger material is inserted into chamber 11 through injectors 21 and passes laterally across the pebble bed in the manner described in connection with Figure 1 above. Effluent materials are removed from chamber 11 through effluent outlet conduits 28. The pebbles which are conditioned, i. e., either heated or cooled in chamber 11 are passed downwardly through conduits 25 and 26 into the upper portion of chamber 11' and gravitate downwardly therethrough similarly to the flow through chamber 11. A second gaseous heat exchange material is injected into the lower portion of chamber 11' through gaseous material injectors 21' and is passed laterally through the pebble beds in chamber 11' similarly to the gas passage through chamber 11. In chamber 11' the gaseous material may be either heated or thermally treated or converted, or may be cooled so as to separate the gaseous material constituents by condensation methods. Where cooling is utilized in the chamber, condensate outlets 33 are provided in the lower portions of elevators 34. In that manner, as pebbles are removed from the lower portion of chamber 11' through pebble outlet conduits 25' and 26', the condensate from chamber 11' is removed with the pebbles and the separation of pebbles and condensate is made in elevators 34, the condensate being removed from the lower portions of elevators 34 through outlets 33. Gaseous material from chamber 11' is removed from the upper portion thereof through effluent outlet conduit 28'. The pebbles from the lower portion of chamber 11' are elevated by means of elevators 34 and are passed to the upper portion of chamber 11 through pebble inlet conduits 29 and 31.

In one modification of the device of this invention, it may be desirable to utilize central pebble inlets and outlets for the chamber. In the device set forth in Figure 5 of the drawing, chamber 22' is supported equi-distant between partitions 16' and 17' by support members 35 and 36. The passages formed between partitions 16 and 17 and the side walls of chamber 37 are baffled similarly to those formed in chamber 11, and chamber 22' is also baffled similarly to chamber 22. Pebbles are inserted into chamber 37 through pebble inlet conduits 38 and form two long, thin contiguous pebble beds as the pebble stream is divided at the top of chamber 22. The two pebble beds are joined together at the bottom of chamber 22 and pebbles are removed from the bottom of chamber 37 through pebble outlet conduits 39. Gaseous heat exchange material is injected into chamber 32 through injectors 21 in the manner described in connection with the device of Figure 1 of the drawing. The gases pass back and forth across and through the pebble beds so as to obtain uniform heat exchange therewith. Chamber 37 may be either shorter or longer than chamber 11 shown in Figure 1 of the drawing. If chamber 37 is shorter than chamber 11, baffle member 27 will not be necessary therein, the top of chamber 22' performing the function of baffle member 27. If chamber 37 is sufficiently longer than chamber 11, additional baffles 18 and 19 and baffles 27 may be provided in chamber 37 so as to obtain increased gas flow through the pebble beds therein. In the device of Figure 5 of the drawing, effluent material is removed through the chambers adjacent the side walls of chamber 37 through effluent outlet conduits 41. Chamber 11 may also be elongated or shortened and the gas passages appropriately baffled so as to obtain more or fewer passes of gaseous heat exchange material through the pebble beds. A central pebble inlet, shown in Figure 5, may be used in combination with a dual pebble outlet shown in Figure 1, or the dual inlets of Figure 1 may be used with the central outlet of Figure 5.

It should be noted that the utilization of this type of pebble heat exchanger substantially obviates the problem of uneven heat exchange resulting from the stagnation of pebbles in the lower portion of the pebble chambers. With the long thin pebble chambers of this invention substantially no stagnation of pebbles is encountered.

Other and further modifications will be obvious to those skilled in the art upon study of the accompanying disclosure. These modifications are believed to be so obvious as to fall within the spirit and scope of the disclosure of this invention.

I claim:

1. A pebble heat exchanger comprising in combination an upright closed four sided shell having parallel sides; a central refractory walled gas chamber extending from end wall to end wall of said outer shell, said gas chamber extending from the upper portion of the chamber formed by said shell downwardly into the lower portion of the chamber formed by said shell; refractory partitions closely spaced from the two side walls of said shell and extending from end wall to end wall and top to bottom of said shell so as to form side wall gas passages between said side walls and said refractory partitions and pebble chambers between said refractory partitions and said central gas chamber; a first baffle in the lower portion of each said side wall gas passage closing the lower portion of said passages from the passage portion above said baffles; a plurality of first gas outlet conduits extending laterally and downwardly from points below said first baffles through said refractory partitions; a plurality of first gas inlets, laterally disposed from said first gas outlets and extending laterally and upwardly through the refractory walls of said central gas chamber; a second baffle intermediate the top and bottom of said central gas chamber and above the level of said first baffles and closing the portion of said gas chamber below said second baffle from the portion of said gas chamber above said baffle; a plurality of second gas outlet conduits below said second baffle but above said first gas inlets extending laterally and downwardly through the walls of said central gas chamber; a plurality of second gas inlet conduits, laterally disposed from said second gas outlet conduits, extending laterally and upwardly through said refractory partitions to points above said first baffles; gaseous material injector means only in said gas passages and below said first baffle; effluent outlet means extending between the exterior of said shell and the gas passages adapted to last receive said gas within said shell; pebble inlet means extending between at least one pebble supply source and the upper portion of said pebble chambers; and pebble outlet means extending between the lower portion of said pebble chambers and the exterior of said shell, each group of said gas inlets having a greater total vertical cross-sectional area than the corresponding group of gas outlets.

2. The pebble heat exchanger of claim 1, wherein a plurality of third gas outlets extends laterally and downwardly through the upper end portion of said refractory partitions; a plurality of third gas inlets, laterally disposed from said third gas outlets, extending laterally and upwardly through the refractory walls of said central gas chamber; and said effluent outlet means is centrally disposed in the upper portion of said shell and extends between said central gas chamber and the exterior of said shell.

SAM P. ROBINSON.

REFERENCES CITED

The following references are of record in the file of this patent:

UNITED STATES PATENTS

| Number | Name | Date |
|---|---|---|
| 2,376,365 | Lassiat | May 22, 1945 |
| 2,448,334 | Watson | Aug. 31, 1948 |
| 2,459,425 | Hemminger | Jan. 18, 1949 |